United States Patent [19]

Pfister

[11] Patent Number: 5,046,396
[45] Date of Patent: Sep. 10, 1991

[54] FASTENING ELEMENT CARRIER STRIP FOR EXPLOSIVE POWDER CHARGE OPERATED SETTING TOOLS

[75] Inventor: Norbert Pfister, Buchs, Switzerland

[73] Assignee: Hilti Aktiengesellschaft, Fürstentum, Liechtenstein

[21] Appl. No.: 530,888

[22] Filed: May 30, 1990

[30] Foreign Application Priority Data

Jun. 1, 1989 [DE] Fed. Rep. of Germany ....... 3917846

[51] Int. Cl.$^5$ .......................................... F16B 15/08
[52] U.S. Cl. .................................... 89/35.01; 411/442
[58] Field of Search .............. 89/35.01; 102/281, 530, 102/531; 411/442, 443

[56] References Cited

U.S. PATENT DOCUMENTS 3,632,032 1/1972 Termet ............................... 89/35.01

Primary Examiner—Stephen C. Bentley
Attorney, Agent, or Firm—Toren, McGeady & Associates

[57] ABSTRACT

A carrier strip (1) for explosive powder charge operated setting tools holds fastening elements or nails (2) in receiving bores (3) equidistantly spaced apart in the strip. Disks (6, 7) hold and guide the nails (2) in the receiving bores (3). Stops (8, 9) are formed in and extend radially inwardly from the inside diameter of the receiving bores (3). The stop (8) leading in the driving direction out of the receiving bores (3) can be overcome for driving the nail out of the bore.

14 Claims, 2 Drawing Sheets

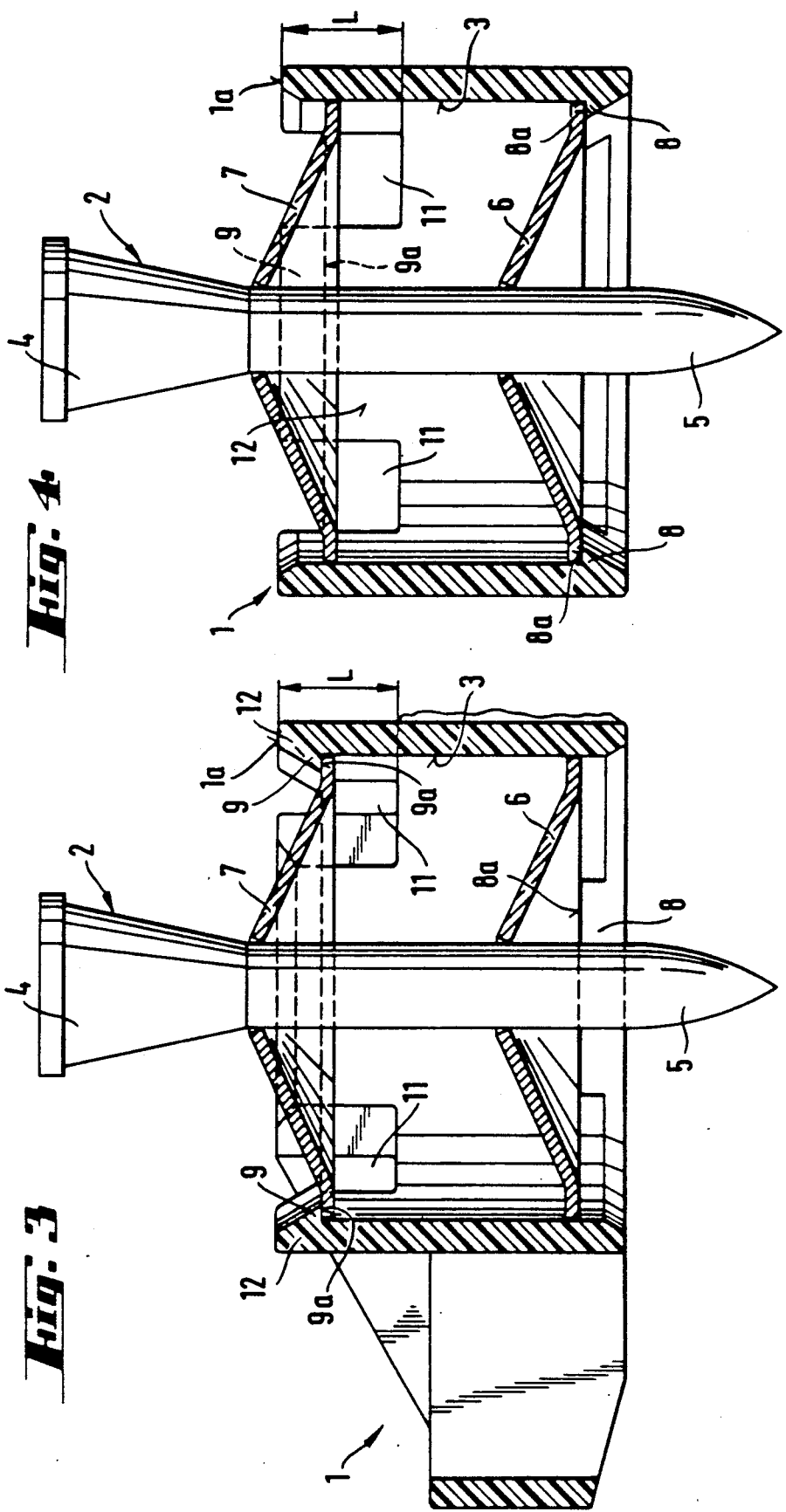

FASTENING ELEMENT CARRIER STRIP FOR EXPLOSIVE POWDER CHARGE OPERATED SETTING TOOLS

BACKGROUND OF THE INVENTION

The present invention is directed to a fastening element carrier strip for explosive powder charge operated setting tools with individual receiving bores spaced equidistantly apart along the strip. Fastening elements or nails are displaceably supported within the receiving bores and the nails have a head, a shank extending from the head, and guide disks in spaced relation on the nails for supporting them in the receiving bores. The head of the nails has an outside diameter not greater than the inside diameter of the receiving bores.

German patent 38 06 624.6 discloses a carrier strip for nails and enables the use of simple conveying and arresting arrangements in the tool and prevents the occurrence of idle strokes of the driving piston in the tool. The nails are retained in the receiving bores of the carrier strip and use the elasticity of the carrier strip for providing a frictionally locked engagement with the nails. Such an arrangement requires accurate matching of the receiving bores and the guide disks.

SUMMARY OF THE INVENTION

Therefore, the primary object of the present invention is to provide a carrier strip enabling support of the nails without accurate matching of receiving bores and guide disks and also preventing axial shifting of the nails prior to the driving operation in the event of heavy jarring or similar sudden forces, such as occur in rough operation on building sites.

In accordance with the present invention, stops for supporting the nails in and/or opposite to the driving direction are provided for at least one of the guide disks. Further, at least the stop leading in the driving direction can be overcome for driving the nails out of the receiving bores.

Before commencing the driving operation, the stops assure a reliable axial support for the nails in the carrier strip unimpaired by jarring or similar forces, even if the diameter of the receiving bores is equal to or slightly larger than the diameter of the guide disks. Because of the functional separation of the guiding and the holding functions, no accurate matching of diameters of the receiving bores to the guide disks of the nails is necessary in the carrier strip.

Due to the axial forces directed against the nails by the driving piston in the tool, the stops are displaced radially outwardly by the guide disks with radially elastic deformation of the carrier strip based on the use of plastics material. Accordingly, the nails and their guide disks can move out of the carrier strip for effecting the setting operation once the driving process has been initiated.

Appropriately, one stop is provided for each of the guide disks. The stops can be offset or spaced apart in the axial direction of the receiving bores corresponding to the spacing between the guide disks, whereby the retaining function of the stops is not mutually influenced, which is particularly advantageous during insertion of the nails into the receiving bores. Accordingly, the stop leading in the setting direction is located ahead of the respective guide disk and the stop trailing in the driving direction trails the corresponding guide disk.

Preferably, the stops are formed as beads extending as part of an annulus located in a plane perpendicular to the axis of the receiving bore and projecting into the opening formed by the bore affording linear support for the guide disks. For instance, if the diameters of the receiving bores and the guide disks are equal, the beads can project in the range of two to several tenths of a millimeter radially into the opening formed by the receiving bores.

In a preferred embodiment, the beads extend in the circumferential direction in an angular or accurate range of 30° to 90°. Because of the arrangement of the beads, their radial projection into the receiving bores can be kept small and, at the same time, adequate support of the guide disks is assured.

To prevent forces, inclined relative to the axis of the receiving bore, during ejection of the nails from the carrier strip when overcoming the action of the stops, two or more accurately extending beads are arranged in the circumferential direction of the receiving bores. As an example, two accurately extending beads form a single stop and can be arranged diametrically opposite one another, with one pair of beads supporting the guide disk leading in the driving direction located in front of the guide disk in the driving direction. Another pair of similar arranged annular beads can support the other guide disk trailing in the driving direction and located behind the guide disk in the driving direction. Both pairs of beads can be arranged offset through 90° relative to one another. As a result, the nails are uniformly retained in the receiving bores. Advantageously, the accurately extending beads have a sawtooth-shaped cross-section in a plane extending along the axis of the receiving bores.

The sawtooth-shaped cross section has a shorter sawtooth flank facing toward and supporting the corresponding guide disk. With such an arrangement, after the insertion of the nails into the carrier strip by sliding the guide disks along a longer sawtooth flank, in position the guide disks are backed or supported by the shorter sawtooth flank of the beads. Preferably the shorter sawtooth flank extends at right angles to the axis of the receiving bores, so that an appropriate axial support for the nails is achieved even with very small radial dimensioning of the beads.

In a preferred arrangement, openings are provided in the receiving bores at the ends trailing in the driving direction and located between the accurately extending beads, with the openings extending in the axial direction from the trailing ends of the receiving bores to a point past the adjacent beads. The parts of the receiving bores remaining between the openings form shell-like fingers articulated to the carrier strip and elastically displaceable in the outward direction. This feature has the advantage, in the introduction of the nails into the receiving bores, of flexing the fingers outwardly with a subsequent rebound of the fingers into the original position due to their flexibility, since the guide disks can move over the beads closer to the trailing end of the receiving bores.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matte in which there are illustrated and described preferred embodiments of the invention.

BRIEF DESCRIPTION OF THE DRAWINGS

In the drawings:

FIG. 3 is a sectional view through the carrier strip taken along the line III—III in FIG. 2, displaying a single receiving bore of the carrier strip on an enlarged scale; and FIG. 4 is a sectional view through the carrier strip taken along the line IV—IV in FIG. 1, and displayed on an enlarged scale.

DETAILED DESCRIPTION OF THE INVENTION

Figure 1:
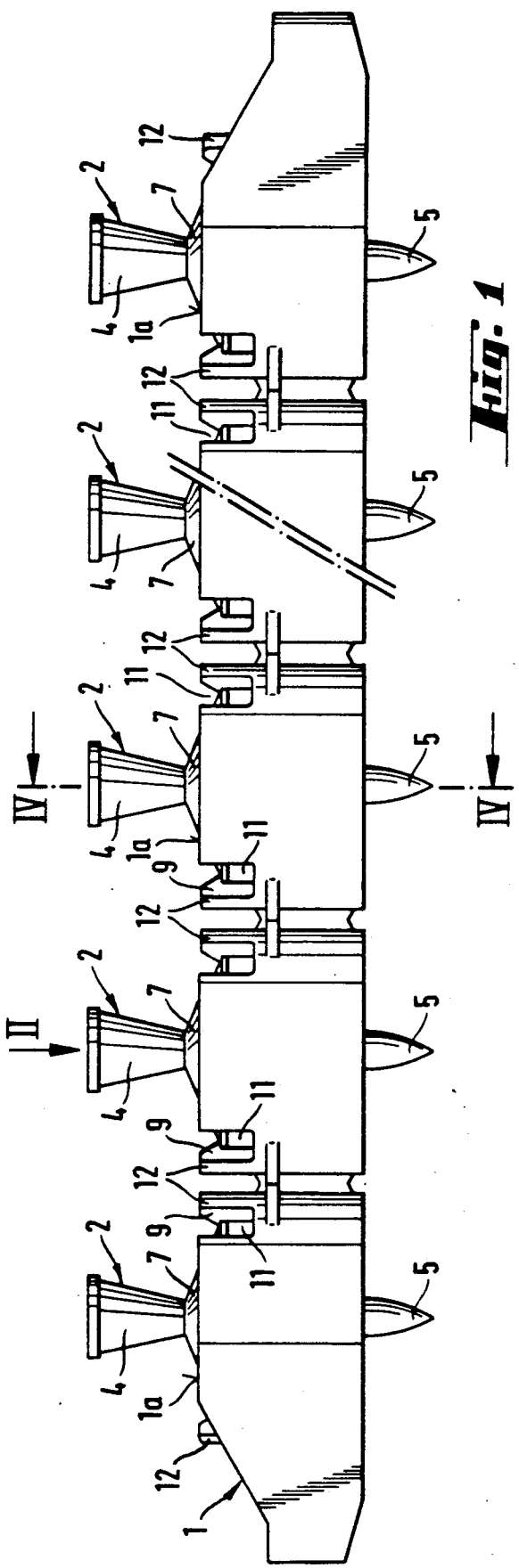
FIG. 1 is a side view of an elongated carrier strip containing nails and embodying the present invention.

In FIG. 1, an elongated carrier strip 1 is illustrated mounting a plurality of nails 2 equidistantly spaced apart.

Figure 2:
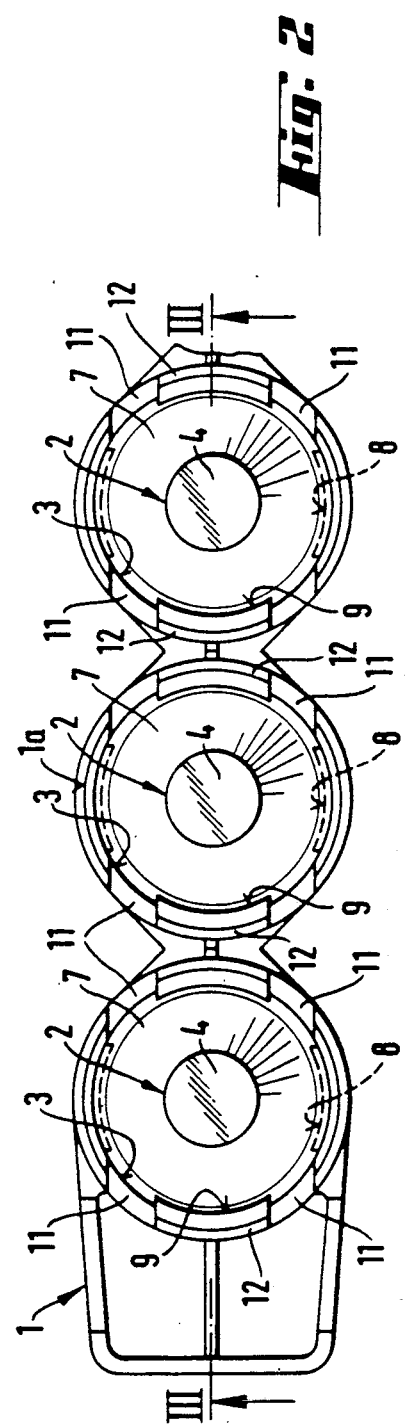
FIG. 2 is a partial end view of the carrier strip illustrated in FIG. 1, and viewed in the direction of the arrow II in FIG. 1.

As shown in FIG. 2, each nail 2 is located within a receiving bore 3 of the carrier strip. As viewed in FIGS. 3 and 4, nails 2 comprise a conically-shaped head 4 and an axially elongated shank 5 projecting from the smaller diameter end of the head. As viewed in FIGS. 1, 3 and 4, the driving direction of the nails or fastening elements is downwardly out of the receiving bores 3 in the carrier strip 1. Accordingly, the lower end of the receiving bores is the leading end and the upper end is the trailing end relative to the driving direction. Each nail 2 is supported in a corresponding receiving bore 3 by a pair of conically shaped guide disks 6, 7 secured on the shank 5. The opening formed by the conically-shaped guide disks 6, 7 are inclined outwardly in the driving direction. Guide disks 6, 7 have the same outside diameter as the inside diameter of the receiving bores 3 and assure concentric axially parallel guidance of the nails 2 in the receiving bores 3.

In addition, guide disks 6, 7 serve for the axial retention of the nails 2 in the carrier strip 1. For this purpose, the guide disks 6, 7 abut axially at stops 8, 9 formed within the receiving bores 3 of the carrier strip 1. Relative to the driving direction, there is a leading stop 8 and a trailing stop 9. Leading stop 8 is formed of accurately extending beads located ahead of the guide disk 6 in the driving direction and the trailing stop 9 is formed of accurately extending beads 9 located rearwardly of the trailing stop in the driving direction. In each of the leading stops 8 and the trailing stops 9, a pair of beads 8, 9 form the stops with each of the beads of a pair located diametrically opposite one another. As shown in FIGS. 3 and 4, the accurately extending beads 8, 9 have a saw-tooth shaped cross section in axial section of the receiving bores 3. The sawtooth-shaped cross section include a shorter sawtooth flank 8a, 9a facing and contacting the guide disks 6, 7 and acting as a support shoulder. In addition, the sawtooth-shaped cross-section of the beads has a longer sawtooth flank extending axially away from the shorter sawtooth flank and away from the corresponding guide disk.

Each of the receiving bores of the carrier strip 1 has openings 11 extending from the trailing ends of the receiving bores toward the leading ends. As can be seen in the drawing, the openings have a generally rectangular shape. The openings 11 have a length L extending in the axial direction of the receiving bores corresponding approximately to 30% of the axial length of the receiving bores 3. The beads 9 are located between the openings 11. The trailing beads 9 are formed on finger-like parts 12 located in the circumferential direction between the openings 11. The parts 12 are articulated along one side to the corresponding receiving bore in the carrier strip and flex radially outwardly during introduction of the nails 2 and guide disks 6, 7 into the receiving bores 3. In other words, the nails are inserted downwardly as viewed in FIG. 1 in the direction of the arrow II into the receiving bores 3 until the leading guide disks 6 contact the leading stops 8 within the bores. After the nails are inserted, the finger-like parts 12 rebound into the position illustrated in FIGS. 3 and 4 for holding the nails and guide disks in place.

While specific embodiments of the invention have been shown and described in detail to illustrate the application of the inventive principles, it will be understood that the invention may be embodied otherwise without departing from such principles.

I claim:

1. Carrier strip (1) for explosive powder charge operated setting tools, said carrier strip having an elongated direction, receiving bores (3) formed in and equidistantly spaced apart in the elongated direction of said carrier strip, said receiving bores having an inside diameter, a leading end facing in the direction nails are to be driven from the carrier strip and a trailing end facing in the opposite direction, an axially extending nail (2) displaceably supported in each said receiving bore, each said nail comprises a head (4), a shank (5) extending axially from the said head, and guide disks (6, 7) fitted on said shank in spaced relation for supporting said nail within one said receiving bore (3), said head (4) having a maximum outside diameter not exceeding the inside diameter of the receiving bore, wherein the improvement comprises stop means in said receiving bores for at least one of said guide disks for retaining said nails in said receiving bore.

2. Carrier strip, as set forth in claim 1, wherein at least one said stop means is located in said receiving bores closer to and between said leading end thereof and an adjacent said guide disk, said stop means arranged to permit said nails to be driven out of the leading end of said receiving bore.

3. Carrier strip, as set forth in claim 2, wherein a leading said guide disk is located adjacent to the leading end of said receiving bore and a trailing guide disk is located adjacent the trailing end of said receiving bore, said stop means comprises a leading said stop for said leading guide disk and a trailing said stop for said trailing guide disk.

4. Carrier strip, as set froth in claim 3, wherein said leading stop (8) is located between said leading fluid disk (6) and the leading end of said receiving bore and said trailing stop (9) is located between said trailing guide disk and said trailing end of said receiving bore, and said guide disks (6, 7) bear against the corresponding said stops (8, 9).

5. Carrier strip, as set forth in claim 4, wherein said leading stop (8) is offset angularly relative to the axis of said receiving bore (3) with respect to said trailing stop (9).

6. Carrier strip, as set forth in claim 5, wherein said leading and trailing stop (8, 9) are formed as beads (8, 9) extending circumferentially around the inside of said receiving bores in a plane perpendicular to the axis of said receiving bores and projecting radially into said receiving bores.

7. Carrier strip, as set forth in claim 6, wherein said beads (8, 9) extend along an arcurate portion of the inside circumference of said receiving bores for an angle in the range of 30° to 90° relative to the axis of said receiving bore.

8. Carrier strip, as set forth in claim 6, wherein at least two said beads 8, 9, are spaced apart in the circumferential direction of said receiving bores (3).

9. Carrier strip, as set forth in claim 6, wherein said beads (8, 9) in an axial section of receiving bore, having a sawtooth-shaped cross-section.

10. Carrier strip, as set forth in claim 9, wherein said sawtooth-shaped cross section beads (8, 9) have a shorter sawtooth flank (8a, 9a) and a longer sawtooth flank with said shorter sawtooth flanks extending transversely of the axis of said receiving disks land in facing contact with the corresponding said guide disks (6, 7).

11. Carrier strip, as set forth in claim 10, wherein the longer sawtooth flanks of said beads (8, 9) extend from said shorter sawtooth flanks (8a, 9a) away from the corresponding said guide disks (6, 7).

12. Carrier strip, as set forth in claim 8, wherein openings (11) are located in and extend through a trailing end section of said receiving bores and extend axially from the trailing end toward the leading end of said trailing bores, said openings located between said beads (9) forming said trailing stop (9), and said openings having a length L extending in the axial direction of the receiving bores (3) from the trailing end of said receiving bores past said trailing stop (9) to a point between said trailing stop and said leading stop.

13. Carrier strip, as set forth in claim 2, wherein said guide disks (6, 7) have a conical shape and are inclined outwardly from said shank (5) of said nails (2) toward the leading end of said receiving bores (3) to the inside surface of said receiving bores.

14. Carrier strip, as set forth in claim 13, wherein said guide disks (6, 7) are located on said shank (5) of said nail (2).

* * * * *